United States Patent
Kikuchi

(10) Patent No.: US 9,268,508 B2
(45) Date of Patent: Feb. 23, 2016

(54) INFORMATION PROCESSING APPARATUS AND SHEET SIZE SETTING METHOD

(71) Applicant: CANON KABUSHIKI KAISHA, Tokyo (JP)

(72) Inventor: Hiroshi Kikuchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/560,287

(22) Filed: Dec. 4, 2014

(65) Prior Publication Data

US 2015/0169271 A1 Jun. 18, 2015

(30) Foreign Application Priority Data

Dec. 18, 2013 (JP) ................................ 2013-261841

(51) Int. Cl.
*G06K 15/00* (2006.01)
*G06F 3/12* (2006.01)
*G06F 3/0484* (2013.01)
*G06F 3/0482* (2013.01)

(52) U.S. Cl.
CPC ............ *G06F 3/1208* (2013.01); *G06F 3/0482* (2013.01); *G06F 3/04842* (2013.01); *G06F 3/1205* (2013.01); *G06F 3/1255* (2013.01); *G06F 3/1285* (2013.01)

(58) Field of Classification Search
CPC ................... G06F 17/30126; G06F 17/30274; G06F 17/241; G06F 17/30011; G06F 17/30705
USPC ................................ 358/1.1–3.31, 1.11–1.18
See application file for complete search history.

(56) References Cited

U.S. PATENT DOCUMENTS

| | | | |
|---|---|---|---|
| 2007/0031162 A1* | 2/2007 | Dombrowski | 399/81 |
| 2008/0069583 A1* | 3/2008 | Takeuchi | 399/81 |
| 2008/0162629 A1* | 7/2008 | Ashida | G06F 3/1205 709/203 |
| 2009/0225346 A1* | 9/2009 | Tokuda | G06F 3/1205 358/1.13 |
| 2014/0368879 A1* | 12/2014 | Kanamoto | G03G 15/50 358/1.15 |

FOREIGN PATENT DOCUMENTS

JP 2006-088638 A 4/2006

* cited by examiner

*Primary Examiner* — Marcellus Augustin
(74) *Attorney, Agent, or Firm* — Carter, DeLuca, Farrell & Schmidt, LLP

(57) ABSTRACT

Printable standard sheets and a range of user-defined sheets are both configured in an editable manner, and the range of user-defined sheets is automatically set in accordance with the printable standard sheets.

12 Claims, 16 Drawing Sheets

FIG. 6

| SHEET NAMES | PRINTABLE FLAGS | SHEET SIZES(mm) | | MARGINS(mm) | | | |
|---|---|---|---|---|---|---|---|
| | | WIDTH(mm) | HEIGHT(mm) | LEFT | RIGHT | TOP | BOTTOM |
| A6 | OFF | 105.0 | 148.5 | 5.0 | 5.0 | 5.0 | 5.0 |
| A5 | ON | 148.5 | 210.0 | 5.0 | 5.0 | 5.0 | 5.0 |
| B5 | ON | 182.0 | 257.0 | 5.0 | 5.0 | 5.0 | 5.0 |
| A4 | ON | 210.0 | 297.0 | 5.0 | 5.0 | 5.0 | 5.0 |
| B4 | OFF | 257.0 | 364.0 | 5.0 | 5.0 | 5.0 | 5.0 |
| A3 | OFF | 297.0 | 420.0 | 5.0 | 5.0 | 5.0 | 5.0 |
| POSTCARD | ON | 100.0 | 148.5 | 5.0 | 5.0 | 5.0 | 5.0 |
| USER-DEFINED SHEET | ON | N/A | N/A | N/A | N/A | N/A | N/A |

| COLLECTIVE SETTING NAMES | SHEET SIZES | | | | | | USER-DEFINED SHEET RANGE (mm) | | | |
|---|---|---|---|---|---|---|---|---|---|---|
| | A6 | A5 | B5 | A4 | B4 | A3 | POST-CARD | USER-DEFINED SHEET | MIN. WIDTH | MAX. WIDTH | MIN. HEIGHT | MAX. HEIGHT |
| A4 SFP | OFF | ON | ON | ON | OFF | OFF | ON | ON | 76.2 | 216.0 | 180.0 | 356.0 |
| A3 MFP | OFF | ON | ON | ON | ON | ON | ON | ON | 99.0 | 320.0 | 139.7 | 1200.0 |

FIG. 11

DOCUMENT SIZE : | A4 ▼ |~101

- A5
- B5
- A4
- B4
- A3
- POSTCARD
- BALLOT SHEET(USER-DEFINED)
- LONG LEDGER SHEET(USER-DEFINED)
- OFFICE NEWSLETTER(USER-DEFINED)

SHEET SIZE SETTINGS — 420

COLLECTIVE SETTING : [A4 SFP ▼] — 421

SHEET SIZES : — 422

| A6 | (105.0×148.5) | UNAVAILABLE ▼ |
| A5 | (148.5×210.0) | AVAILABLE ▼ |
| B5 | (182.0×257.0) | AVAILABLE ▼ |
| A4 | (210.0×297.0) | AVAILABLE ▼ |
| B4 | (257.0×364.0) | UNAVAILABLE ▼ |
| A3 | (297.0×420.0) | UNAVAILABLE ▼ |
| POSTCARD | (100.0×148.5) | ONE-SIDE ONLY ▼ |
| USER-DEFINED SHEET | | AVAILABLE ▼ |

USER-DEFINED SHEET RANGE : — 423

WIDTH : [76.2] mm ~ [216.0] mm

HEIGHT : [180.0] mm ~ [356.0] mm

[OK] 428  [CANCEL] 429

FIG. 22

SHEET SIZE SETTINGS — 430

COLLECTIVE SETTING: [A4 SFP ▼] — 431

SHEET SIZES: — 432

| | | |
|---|---|---|
| A6 | (105.0×148.5) | UNAVAILABLE ▼ |
| A5 | (148.5×210.0) | AVAILABLE ▼ |
| B5 | (182.0×257.0) | AVAILABLE ▼ |
| A4 | (210.0×297.0) | AVAILABLE ▼ |
| B4 | (257.0×364.0) | UNAVAILABLE ▼ |
| A3 | (297.0×420.0) | UNAVAILABLE ▼ |
| POSTCARD | (100.0×148.5) | ONE-SIDE ONLY ▼ |
| USER-DEFINED SHEET | | AVAILABLE ▼ |

USER-DEFINED SHEET RANGE: — 433

WIDTH: [76.2] mm ~ [216.0] mm
HEIGHT: [180.0] mm ~ [356.0] mm

USER-DEFINED SHEET RANGE (DUPLEX-PRINTABLE): — 434

WIDTH: [148.5] mm ~ [210.0] mm
HEIGHT: [210.0] mm ~ [297.0] mm

[OK] 438  [CANCEL] 439

INFORMATION PROCESSING APPARATUS AND SHEET SIZE SETTING METHOD

BACKGROUND OF THE INVENTION

1. Field of the Invention

The present invention relates to an information processing apparatus and a sheet size setting method for controlling, for example, a plurality of types of image forming apparatuses with different functions.

2. Description of the Related Art

As a conventional technique, a method is known in which a printer driver obtains the sizes of user-defined sheets that are currently loaded in cassettes from a printer, and displays these user-defined sheets as usable sheets (Japanese Patent Laid-Open No. 2006-88638).

When the method described in Japanese Patent Laid-Open No. 2006-88638 is used, the sizes of sheets that are currently loaded in cassettes can be obtained and displayed in a selectable manner, but only the sizes of the sheets loaded in the cassettes are usable. It is desirable that a size with which a user wishes to perform printing be freely selectable from among all printable user-defined sheets, whether or not sheets of that size are loaded in cassettes. To this end, some of the printer drivers that can particularly control a plurality of types of printers enable a user to select a model name of a printer and identify usable sheet sizes based on the selected model. Unfortunately, this method is problematic in that, even if a printer driver is compatible with an unknown printer to be provided in the future, it is difficult to identify usable sheet sizes, and an optimal option for user-defined sheets cannot be provided to the user.

SUMMARY OF THE INVENTION

The present invention has been made in view of the foregoing conventional example, and provides an information processing apparatus and a sheet size setting method that enable easy selection of sheets that are printable by a printer, even with respect to an unknown printer to be provided in the future.

The present invention has the following configuration.

An information processing apparatus connectable to an image forming apparatus, the information processing apparatus including: a user interface unit that displays a sheet size setting screen for setting a range of a size of a user-defined sheet printable on the image forming apparatus; a setting unit that sets the range of the size of the user-defined sheet using the sheet size setting screen; a selection unit that selects, from among a plurality of user-defined sheets, a user-defined sheet that is made available based on the range of the size of the user-defined sheet set on the sheet size setting screen; and a display unit that displays the selected user-defined sheet as an option for a sheet size of print setting information.

In another aspect, the present invention has the following feature.

An information processing apparatus connectable to an image forming apparatus, the information processing apparatus including: a user interface unit that displays a sheet size setting screen for setting a standard sheet and a range of a width and a height of a user-defined sheet that are printable on the image forming apparatus; a unit that stores the printable standard sheet and the range of the width and the height of the printable user-defined sheet set on the sheet size setting screen; a change unit that, when the range of the width and the height of the printable user-defined sheet is set by the user interface unit, changes the printable standard sheet in accordance with the set range of the width and the height of the printable user-defined sheet; and a unit that, in response to a request for a printable sheet list, returns a list of the printable standard sheet and a user-defined sheet that falls within a range of a width and a height of a size of the printable user-defined sheet to a source of the request.

The present invention enables easy selection of sheets that are printable on a printer, even with respect to an unknown printer to be provided in the future; therefore, convenience is improved.

Further features of the present invention will become apparent from the following description of exemplary embodiments with reference to the attached drawings.

BRIEF DESCRIPTION OF THE DRAWINGS

FIG. 6 shows a printable sheet information list.

FIG. 11 shows options for the document size of the printer driver UI.

FIG. 21 shows a sheet size setting screen of the printer driver.

FIG. 22 shows a sheet size setting screen of the printer driver.

DESCRIPTION OF THE EMBODIMENTS

First Embodiment

Configuration of Print System

Figure 1:
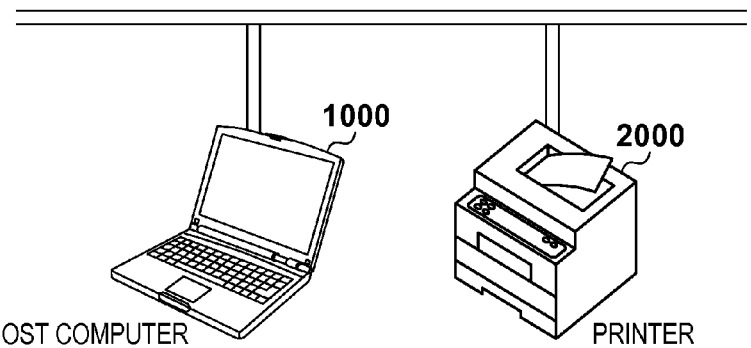
FIG. 1 shows an overall configuration of a print system according to present embodiments.

First, a configuration of a print system according to the first embodiment will be described. FIG. 1 shows one example of an overall configuration of the print system according to the present embodiment. The system according to the embodiment includes at least a client PC 1000 and a printer 2000, which are an information processing apparatus and an image forming apparatus, respectively. It goes without saying that the present invention is applicable to a single device and to a system made up of a plurality of devices as long as functions of the present invention are executed, unless otherwise specified. Also, it goes without saying that the present invention is applicable to a system of local connection and to a system of connection via a network such as a LAN and a WAN as long as functions of the present invention are executed, unless otherwise specified.

Figure 2:
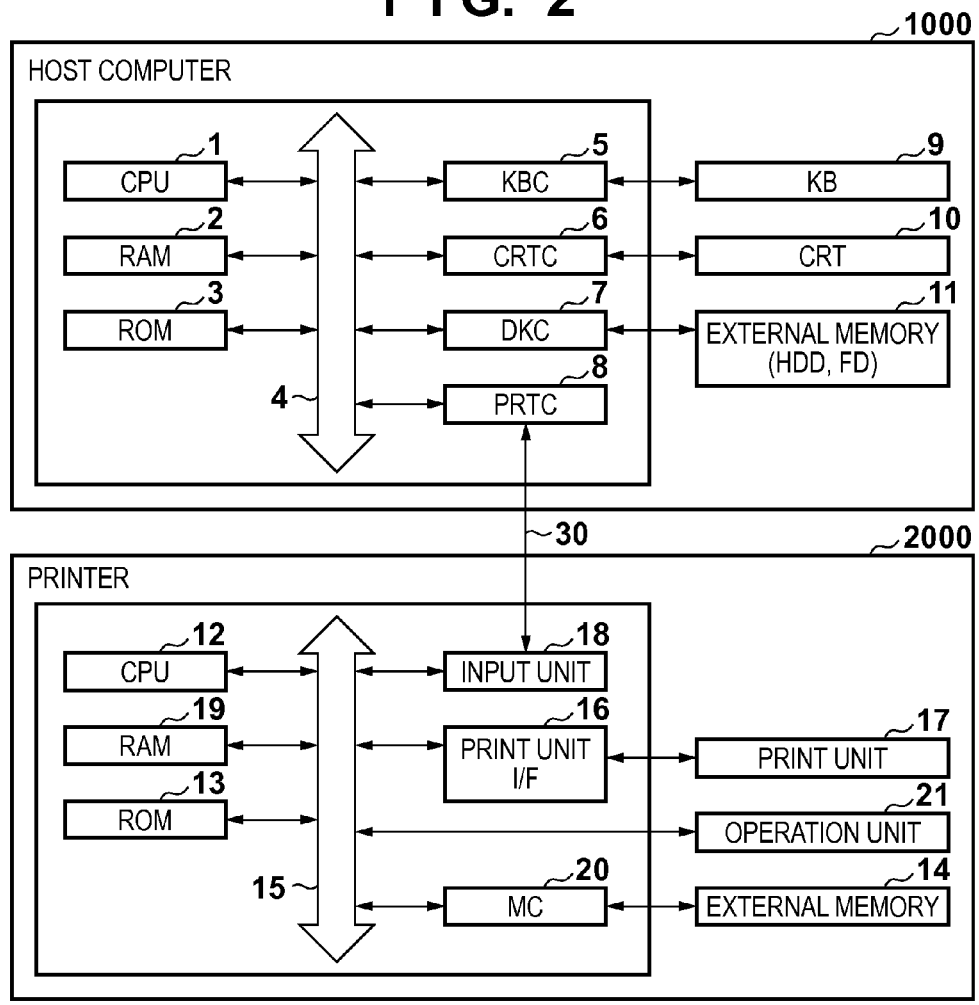
FIG. 2 is a block diagram of the print system according to the present embodiments.

A description is now given of a configuration of a print system representing an embodiment of the present invention with reference to a block diagram of FIG. 2. In the host computer 1000, a CPU 1 performs overall control of modules connected to a system bus 4. A ROM 3 or an external memory 11 stores an operating system (hereinafter, OS), various types of applications, data used thereby, and the like. A RAM 2 functions as a main memory, a working area, and the like for the CPU 1.

A keyboard controller (KBC) 5 controls key input from a keyboard 9 and a pointing device that is not shown. A CRT controller (CRTC) 6 controls display on a CRT display (CRT) 10. A disk controller (DKC) 7 controls access to the external memory 11 such as a hard disk (HDD), which stores various types of applications, a printer control command generation program (hereinafter, printer driver), and the like. A printer controller (PRTC) 8 is connected to the printer 2000 via a bidirectional interface (interface) 30, and executes processing for controlling communication with the printer 2000. The CPU 1 executes, for example, processing for deploying an outline font to a display information RAM set in the RAM 2 (rasterization), and enables WYSIWYG on the CRT 10. The CPU 1 also opens various types of registered windows based on commands designated by the pointing device (not shown) such as a mouse on the CRT 10, and executes various types of data processing. At the time of execution of printing, a user can open a window related to print settings, and configure printer settings and settings of a print processing method with respect to the printer driver, including selection of a print mode. It should be noted that the printer driver of the present application may support a plurality of types of printers.

The printer 2000 is controlled by a CPU 12. The printer CPU 12 operates based on, for example, a control program stored in a ROM 13, or a control program stored in an external memory 14. The CPU 12 outputs an image signal as output information to a print unit (printer engine) 17 connected to a system bus 15 via a print unit I/F 16.

The CPU 12 can execute processing for communication with the host computer via an input unit 18, and notify the host computer 1000 of information in the printer and the like. A RAM 19 functions as a main memory, a working area, and the like for the CPU 12. Access to the aforementioned external memory 14 such as a hard disk (HDD) and an IC card is controlled by a memory controller (MC) 20. Switches, an LED display, and the like for operating the printer 2000 are arranged in an operation unit 21.

It should be noted that processing described in the present working example is realized by loading a program stored in the ROM 3 or the external memory 11 to the RAM 2 and executing the loaded program with the CPU 1.

Figure 3:
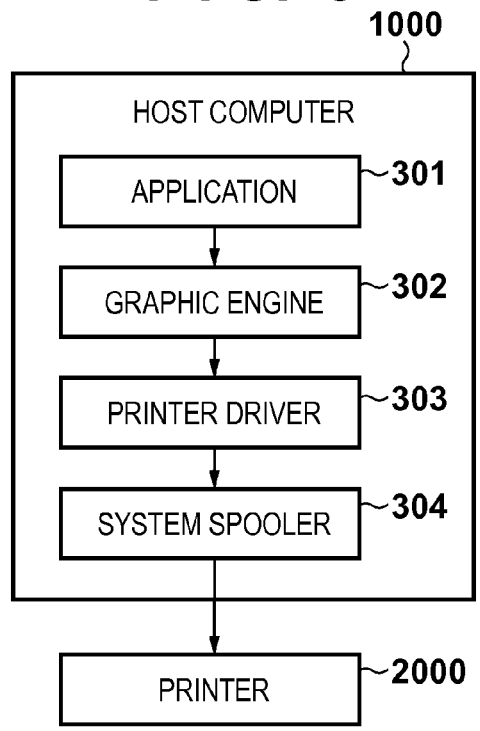
FIG. 3 is a configuration diagram of typical print processing.

With reference to a configuration diagram of FIG. 3, the following describes typical print processing in the host computer 1000 to which a print apparatus such as the printer 2000 is connected directly or via a network. An application 301, a graphic engine 302, a printer driver 303, and a system spooler 304 exist as files stored in the external memory 11. They are loaded to the RAM 2 and executed by the OS and a module that uses a module of the OS. The application 301 and the printer driver 303 can be added to an FD representing the external memory 11 and a CD-ROM that is not shown, or to an HDD representing the external memory 11 via a network that is not shown. The application 301 is loaded to the RAM 2 and executed; it performs output (rendering) using the graphic engine 302, which is similarly loaded to the RAM 2, when printing is performed on the printer 2000.

The graphic engine 302 similarly loads the printer driver 303, which is prepared for an individual print apparatus, from the external memory 11 to the RAM 2. GDI functions output from the application 301 are converted into print format data described in DDI functions, XPS or the like, and then output to the printer driver 303. It should be noted that GDI is an abbreviation for Graphic Device Interface, DDI is an abbreviation for Device Driver Interface, and XPS is an abbreviation for XML Paper Specification. The printer driver 303 performs conversion into a control command that can be recognized by the printer, such as a PDL (Page Description Language), based on rendering data received from the graphic engine 302. Herein, one control command set generated from one print request is referred to as an output job. A generated output job is output as print data to the printer 2000 via the interface 30 by way of the system spooler 304 loaded to the RAM 2 by the OS. The computer 1000 is connectable to the printer 2000 of various models, and the printer driver 303 is compatible with a plurality of models.

<User Interfaces of Printer Driver 303>

Figure 4:
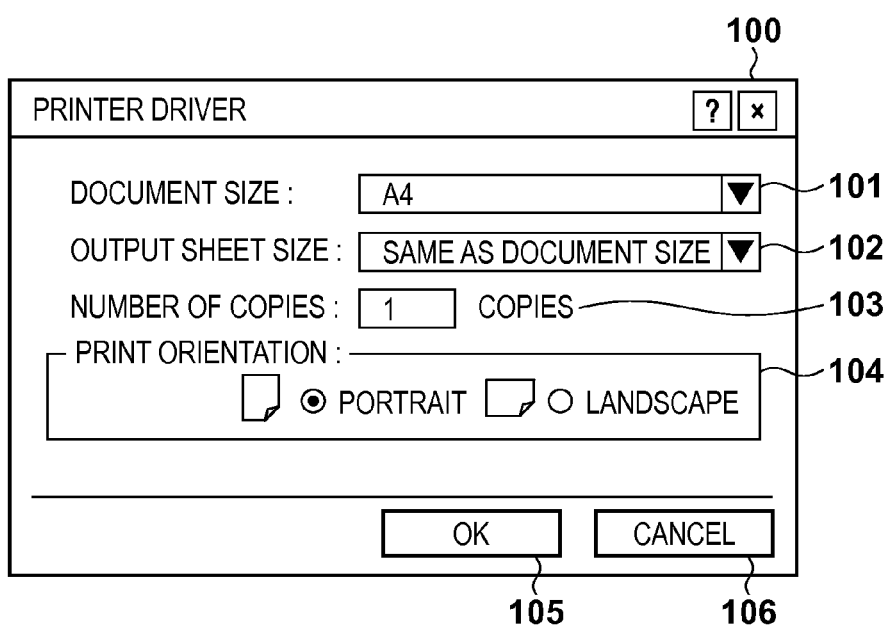
FIG. 4 shows a print setting screen of a printer driver.
Figure 5:
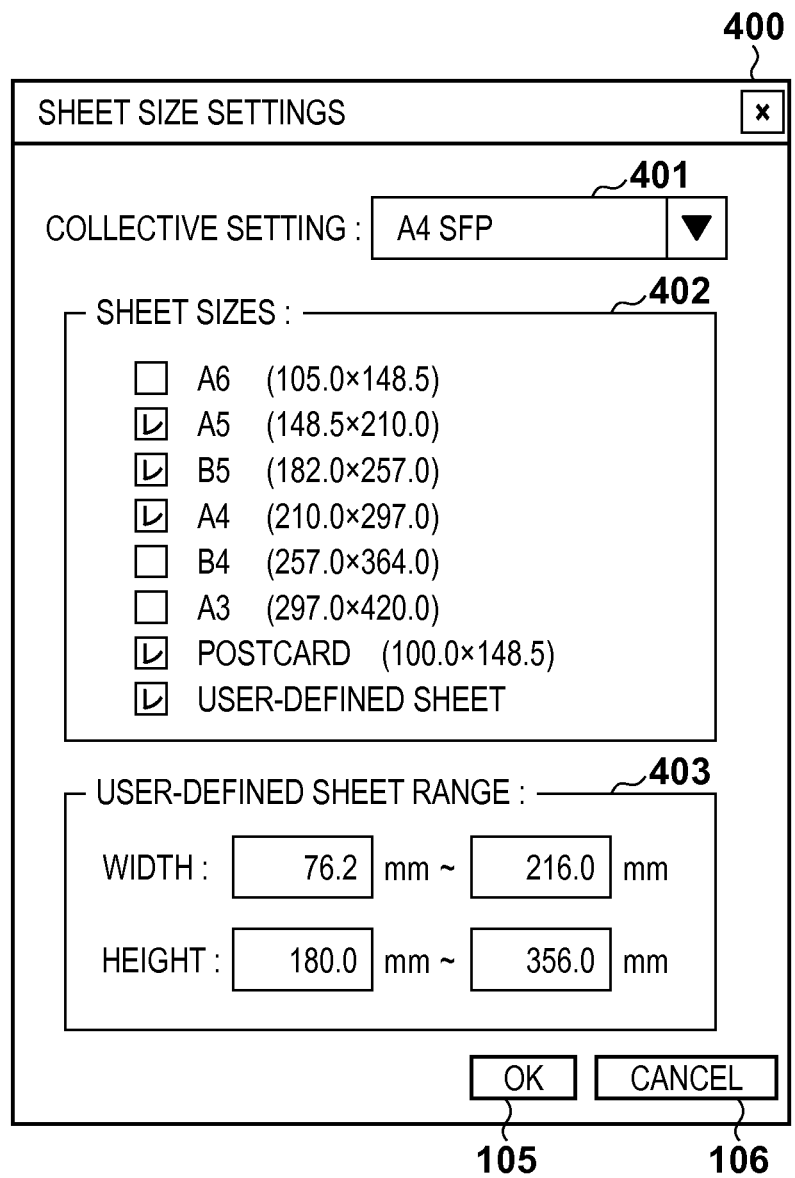
FIG. 5 shows a sheet size setting screen of the printer driver.

A description is now given of user interfaces of the printer driver 303 according to the present embodiment with reference to FIGS. 4 and 5. A dialog shown in FIG. 4 represents a print setting screen 100, which is one of the user interfaces of the printer driver 303. By operating the print setting screen 100, the user can designate print setting information for generation of an output job in the printer driver 300. A document size 101 is a sheet size of a document to be printed, and can be designated from the application. An output sheet size 102 is a size of a sheet to be used in actual printing, and a default value thereof is "same as document size" as shown in FIG. 4. Any printable sheet size can be selected as the output sheet size 102. If a sheet size different from the document size is designated as the output sheet size 102, the printer driver generates a PDL by magnifying/reducing rendering data from the document size to the designated output sheet size. A number of copies 103 is for designating the number of copies to be printed. A print orientation 104 is for designating portrait or landscape as a sheet orientation for document data. Normally, the print orientation 104 can be designated from the application as well.

On the other hand, a dialog 400 shown in FIG. 5 represents a sheet size setting screen, which is one of the user interfaces of the printer driver 303 and is for designating printable sheet sizes from the printer driver 303. The dialog 100 (print setting screen) shown in FIG. 4 is used to set print setting information for an output job. On the other hand, the dialog 400 (sheet size setting screen) shown in FIG. 5 is used to designate an operation of the printer driver itself. The dialog 400 can be edited by an administrator of the printer driver 303. The printer driver 303 decides on printable sheet sizes with reference to settings on the sheet size setting screen 400 shown in FIG. 5 in displaying the print setting screen 100 and providing printable sheet sizes to the application. Collective setting 401 is a selection field for collectively setting sheet size information prepared in advance by designating a setting name. This will be described later in detail. All standard sheets that can be used by the printer driver 303 are displayed under sheet sizes 402, together with their respective checkboxes. When a checkbox is checked, it means that a corresponding sheet size is printable. When the sheet size setting screen 400 is in a state shown in FIG. 5, the printer driver 303 can perform printing on a total of four types of standard sheets, that is to say, A5, B5, A4, and postcard, and cannot perform printing on a total of three types of standard sheets, that is to say, A6, B4, and A3. One checkbox corresponding to a user-defined sheet is also displayed under the sheet sizes 402. It should be noted that the user-defined sheet is sheet information that is registered by the user setting a height and a width. The user-defined sheet is printable when checked, and unprintable when unchecked. A range of a size of a user-defined sheet that can be printed from the present printer driver 303 can be designated in a user-defined sheet range 403. The printer driver 303 performs control such that, among a plurality of sheet sizes registered with the OS, only user-defined sheets that fall within a range designated as the user-defined sheet range 403 are printable. The sheet sizes 402 and the user-defined sheet range 403 can each be freely edited by the administrator of the printer driver 303. The flow in which the printer driver 303 decides on printable sheets based on the foregoing information will be described later. The sheet sizes and the user-defined sheet range set on the screen shown in FIG. 5 are stored as current sheet size setting values. In the case of the aforementioned collective setting, sheet size setting values corresponding to a designated name are written as current sheet size setting values.

<Sheet Information List and User-Defined Sheet List>

FIG. 6 shows a sheet information list 600 that stores information related to printable sheets managed by the printer driver 303. The sheet information list 600 shown in FIG. 6 corresponds to the state of the sheet size setting screen 400 shown in FIG. 5. Under sheet names 601, all standard sheets (605 to 611) and a user-defined sheet (612) that can be used by the printer driver 303 are lined up. Under printable flags 602, whether or not standard sheets are printable is indicated using ON or OFF on a sheet-by-sheet basis. These indications correspond one-to-one to the sheet sizes 402 on the sheet size setting screen 400. The sheet information list 600 also retains sheet sizes 603, their respective margins 604, and the like.

Figure 7:
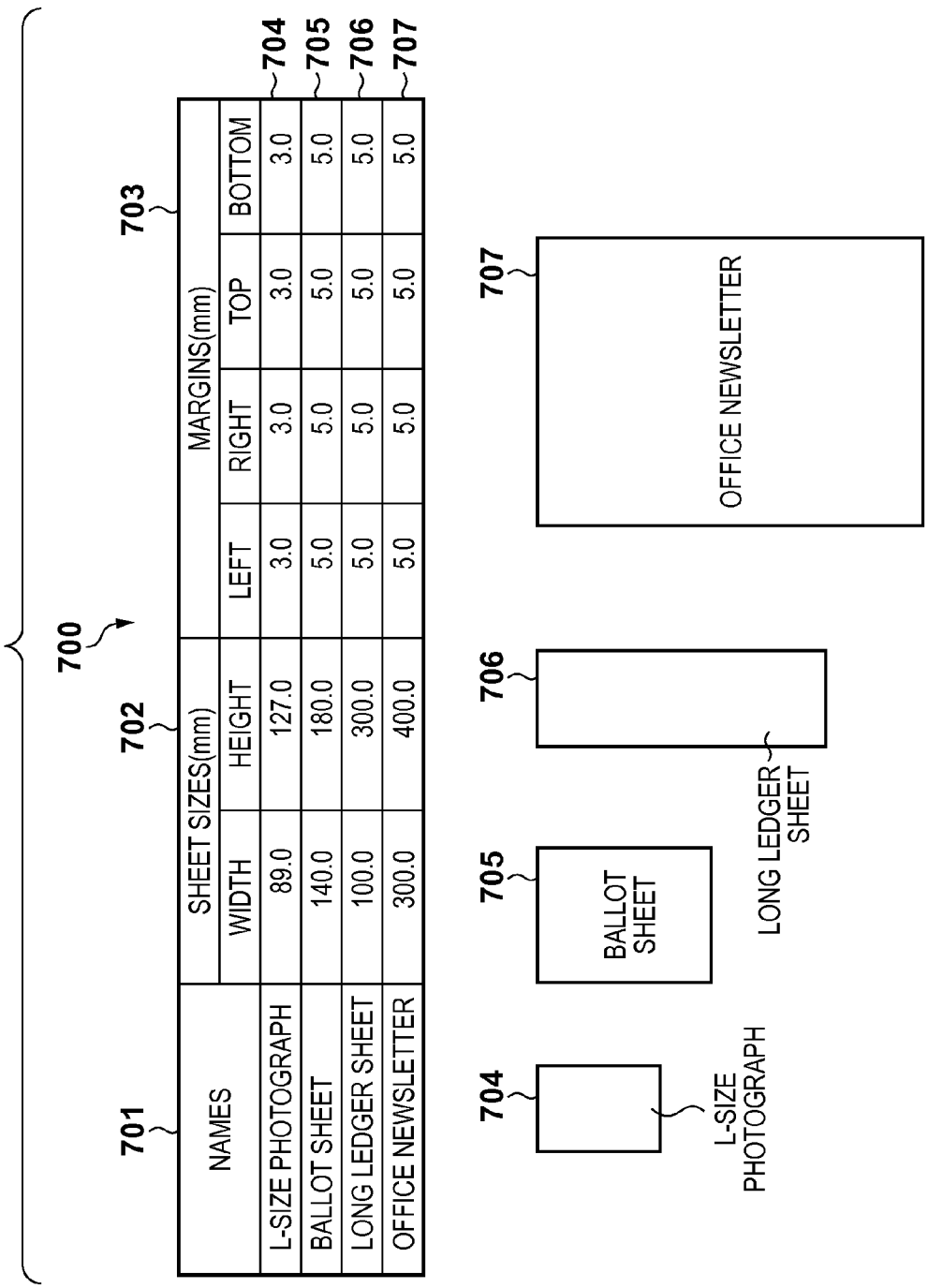
FIG. 7 shows a list of user-defined sheets registered with an OS.

On the other hand, FIG. 7 shows a list 700 of user-defined sheets that are registered with the OS of the host computer 1000 in advance. The OS manages user-defined sheets of arbitrary sizes in addition to standard sheets. The user can newly register user-defined sheets with the OS. As one example, FIG. 7 shows the list 700 of user-defined sheets for a case in which the user has registered the following four user-defined sheets with the OS: "L-size photograph", "ballot sheet", "long ledger sheet", and "office newsletter". Information of the user-defined sheets includes names 701, sheet sizes 702, and margins 703, and they are managed by the OS.

Figures 8, 9:
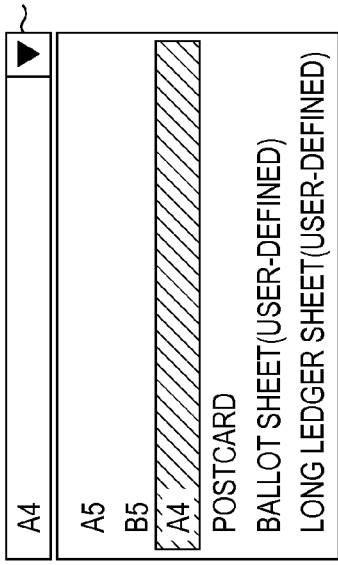
FIG. 8 shows options for a document size of a printer driver UI.
FIG. 9 shows a collective setting information list.

FIG. 8 shows options 801 for the document size 101 on the print setting screen 100 of the printer driver 303. Standard sheets "A5", "B5", "A4", and "postcard", whose printable flags 602 are ON in the sheet information list shown in FIG. 6, are displayed as options. User-defined sheets are displayed as well because the printable flag 602 for the user-defined sheet 612 is ON in the sheet information list shown in FIG. 6. Out of the list 700 of user-defined sheets registered with the OS shown in FIG. 7, only user-defined sheets that fall within the range indicated by the user-defined sheet range 403 on the sheet size setting screen 400 are displayed. That is to say, "ballot sheet" and "long ledger sheet" are displayed in a selectable manner as printable user-defined sheets. The flow in which the printer driver 303 lists printable user-defined sheets will be described later in detail.

Returning to FIG. 5, the collective setting user interface 401 will now be described. As stated earlier, the sheet sizes 402 and the user-defined sheet range 403 on the sheet size setting screen 400 can be arbitrarily changed by the administrator of the printer driver 303. However, a collective setting function of collectively setting them is provided to the sheet size setting screen 400 to achieve further improvement in usability. The administrator can collectively set sheet size information prepared in advance by selecting an arbitrary item in the collective setting 401. FIG. 9 shows a collective setting information list 500 that is managed by the printer driver 303 for the collective setting function. The collective setting information list 500 retains collective setting names (501), information indicating ON or OFF of printable flags for standard sheets (502), and information indicating ranges of dimensions of printable user-defined sheets (503). The printer driver 303 lists the collective setting names 501 in the collective setting information list 500 as options for the collective setting 401 on the sheet size setting screen 400. When the user has selected one of them, the printer driver 303 collectively sets the sheet sizes 402 and the user-defined sheet range 403 with reference to the collective setting information list 500. This enables the administrator of the printer driver 303 to skip the trouble of step-by-step setting.

Figure 10:
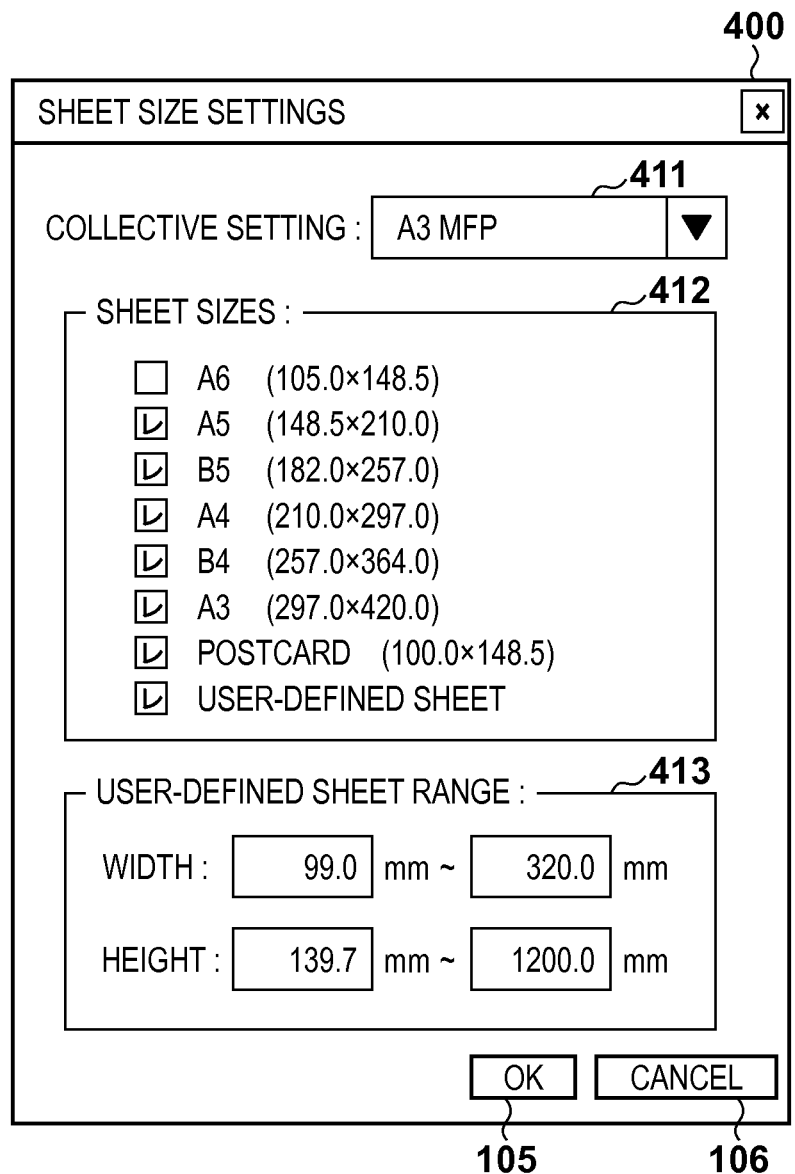
FIG. 10 shows the sheet size setting screen of the printer driver.

As one example of collective setting, FIG. 10 shows the sheet size setting screen 400 for a case in which the administrator has changed the collective setting 401 on the sheet size setting screen 400 shown in FIG. 5 from "A4 SFP" to "A3 MFP". It can be seen that sheet sizes 412 and a user-defined sheet range 413 have been collectively set in accordance with the collective setting information list 500. FIG. 11 shows options 802 for the document size 101 on the print setting screen 100 of the printer driver 303 in this state. It can be seen that "B4" and "A3" have been added as selectable standard sheets, and "office newsletter" has been newly added as a user-defined sheet due to a change in the user-defined sheet range.

The collective setting information list 500 includes only two collective settings in the example of FIG. 9; more preferably, it retains a larger number of collective settings in accordance with types of printers supported by the printer driver 303. Furthermore, convenience can be further improved by providing the printer driver 303 with a mechanism to add a collective setting item in a post-hoc manner to the printer driver 303 already installed in the host computer 1000.

<Procedure for Generating Printable List (User-Defined Sheets)>

Figure 12:
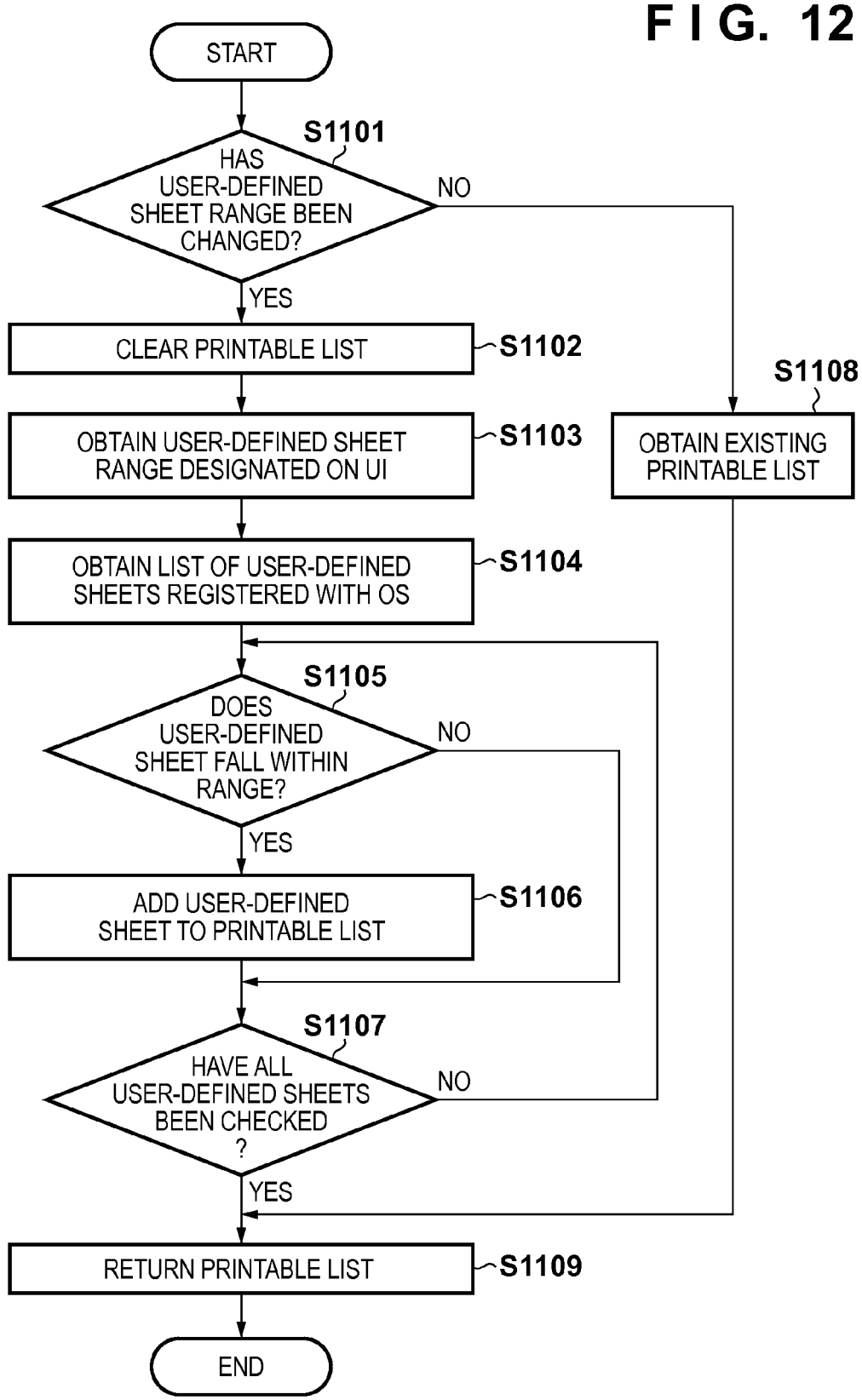
FIG. 12 is a flow diagram for returning a list of printable user-defined sheets.

With reference to FIG. 12, the following describes the flow in which the printer driver 303 displays options for the document size 101 and provides a list of printable sheet sizes (printable list) to the application. Specifically, in this flow, the printer driver 303 generates the list 801 shown in FIG. 8 in a case where the user-defined sheets in the list 700 shown in FIG. 7 has been registered with the OS in the state of the sheet size setting screen 400 shown in FIG. 5. Among processing of the printer driver 303 for listing printable sheet sizes, processing related to standard sheets will be omitted from the following description because it is obvious that standard sheet sizes whose printable flags 602 are ON are listed with reference to the sheet information list 600. The flow related to user-defined sheets will be described below. The processing shown in FIG. 12 is executed, for example, when an OK button 105 is pressed after the user-defined sheet range has been changed on the sheet size setting screen 400 shown in FIG. 5. It is desirable that the procedure shown in FIG. 12 be executed also when there has been a change in the list 700 of user-defined sheets registered with the OS shown in FIG. 7. In this case, in step S1101 of FIG. 12, whether or not the range of dimensions of the user-defined sheet has been changed, or whether or not the list 700 of user-defined sheets registered with the OS has been changed, is determined, and processing moves to step S1102 if either of them has been changed. FIG. 12 may be executed when the application has issued a request for the printable list.

First, in step S1101 of FIG. 12, the printer driver 303 determines whether or not the user-defined sheet range 403 has been changed. If it has not been changed, the printer driver 303 obtains an existing printable list (step S1108) and returns it to a source of the request for the printable list, such as the application and a UI driver (step S1109). If it has been changed, the printer driver 303 clears the printable list (step S1102). Then, the printer driver 303 obtains a range of printable user-defined sheets designated as the user-defined sheet range 403 (step S1103). Next, the printer driver 303 obtains the list 700 of user-defined sheets registered with the OS from the OS (step S1104). Next, the printer driver 303 determines whether or not the user-defined sheets registered with the list 700 fall within the range of printable user-defined sheets on a sheet-by-sheet basis (step S1105). It is assumed here that whether or not the user-defined sheets fall within the range is determined based on both the sheet sizes and margins. Regarding the sheet sizes, whether or not the vertical and horizontal lengths of the user-defined sheets fall within the range obtained in step S1103 is determined. Regarding the margins, whether or not the user-defined sheets have margins larger than the minimum margin retained in the printer driver 303 is determined. It should be noted that the minimum margin is 5.0 mm in the present embodiment. Therefore, in the list 700 shown in FIG. 7, "L-size photograph" does not satisfy a condition about the minimum margin. The printer driver 303 adds the user-defined sheets to the printable list if their sheet sizes and margins both fall within the range (step S1106), and do not add them to the printable list if their sheet sizes and margins do not fall within the range. That is to say, user-defined sheets that fall within or match the user-defined sheet range are validated to be displayed on the print setting screen. If the determination has been completed for all user-defined sheets in step S1107, the printer driver 303 returns the generated printable list in step S1109. There were technologies to decide on printable user-defined sheets based on margins in the past; on the other hand, according to the present invention, a user-defined sheet range that has been arbitrarily set by the administrator is added as a condition, and therefore a printer to be sold in the future with unknown specifications can be supported.

<Processing for Changing User-Defined Sheet Range Due to Change in Usable Standard Sheets>

Figure 13:
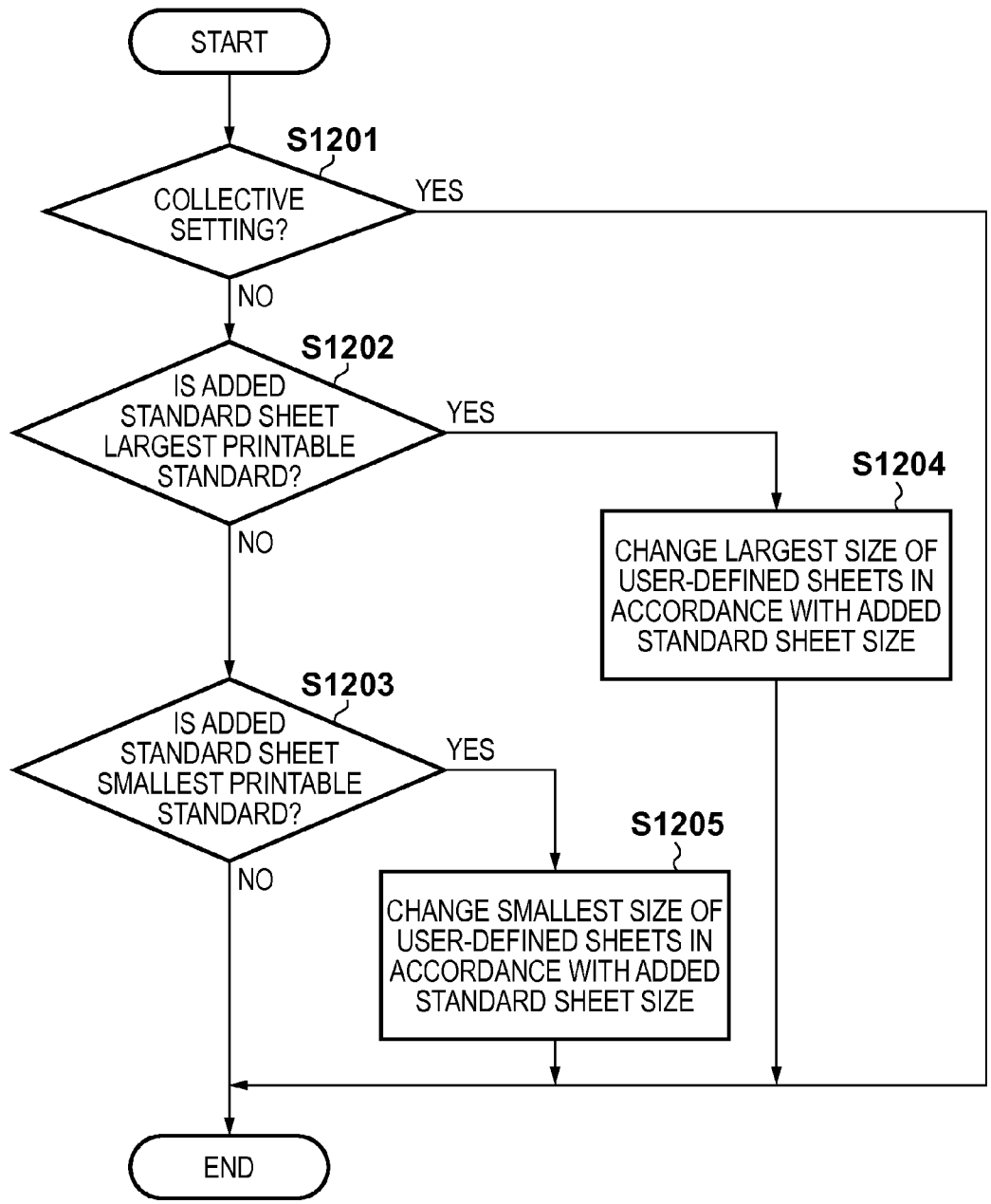
FIG. 13 is a flow diagram for a case in which a printable standard sheet has been added.

With reference to a flowchart of FIG. 13, the following describes processing executed by the printer driver 303 when a printable standard sheet size 402 has been added on the sheet size setting screen 400 through an operation of the administrator in an embodiment of the present invention. First, in step S1201, the printer driver determines whether or not a printable standard sheet size has been added through collective setting (step S1201), and does not perform anything if the addition has been made through collective setting. This is because sheet sizes are set in accordance with printable standard sheet sizes in collective setting. If the addition has been made through a manual operation on a checkbox instead of collective setting, the printer driver 303 proceeds to step S1202, and determines whether or not the added standard sheet size is larger than the largest standard size of the printable sheet size setting values prior to the addition. If the added standard sheet size is larger than the largest standard size, processing proceeds to step S1204, and the printer driver 303 changes the largest size of the user-defined sheet range 403 in accordance with the added standard sheet size. Specifically, if the added standard sheet size is larger than the largest size of the current user-defined sheet range 403, the largest size of the user-defined sheet range 403 is changed to the added standard sheet size. The size is changed individually for the width and the height. Therefore, if the largest size of the user-defined sheet range 403 is already larger than the added standard sheet size, nothing is performed. If the added standard sheet does not have the largest size in step S1202, the printer driver 303 next determines whether or not the added standard sheet is smaller than the smallest standard size of the printable sheet size setting values prior to the addition in step S1203. If the added standard sheet is smaller than the smallest standard size, processing proceeds to step S1205, and the printer driver 303 changes the smallest size of the user-defined sheet range 403 in accordance with the added standard sheet size. Specifically, if the added standard sheet size is smaller than the smallest size of the current user-defined sheet range 403, the smallest size of the user-defined sheet range 403 is changed to the added standard sheet size. The size is changed individually for the width and the height. Therefore, if the smallest size of the user-defined sheet range 403 is already smaller than the added standard sheet size, nothing is performed.

In this way, if a printable standard sheet has been added through an operation of the administrator, the printer driver 303 automatically adjusts the sizes of printable user-defined sheets, which results in improved convenience. The present invention is particularly effective in, for example, a case where a printer capable of printing up to A4 size is replaced with a printer capable of printing up to A3 size. By using the printer driver 303 of the present invention, the administrator can issue a print instruction for an appropriate standard sheet simply by operating the sheet size setting screen 400 without re-installing the printer driver. A range of printable user-defined sheets is automatically set, even if the administrator does not know the detail of a range of printable user-defined sheets of a new printer. Furthermore, settings that better suit a printer can be configured through re-input to the user-defined sheet range 403 on the sheet size setting screen 400 upon discovery of the range of printable user-defined sheets.

Figure 14:
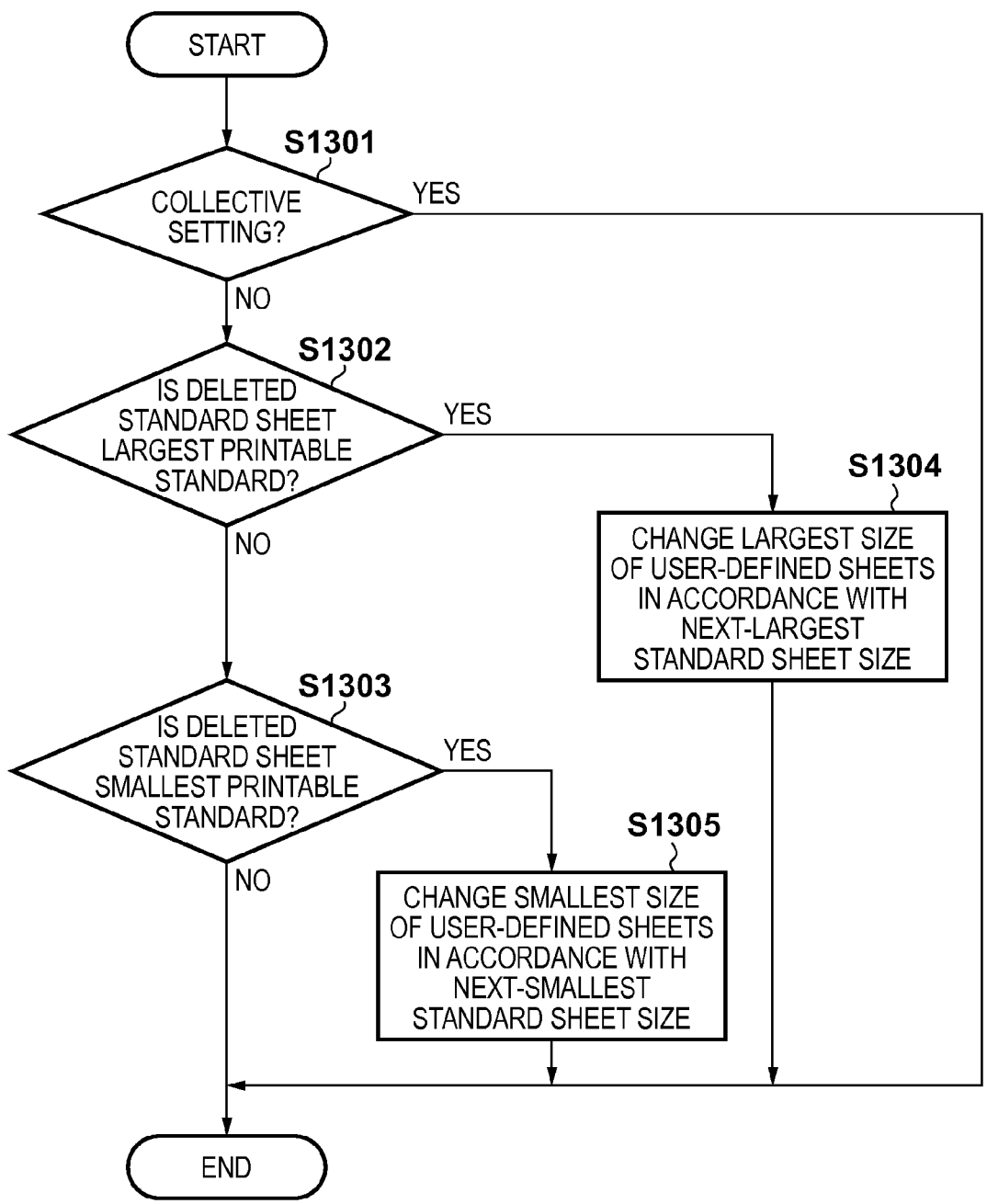
FIG. 14 is a flow diagram for a case in which a printable standard sheet has been deleted.

While the above has described the flow for a case in which a printable standard sheet size 402 has been added by the administrator with reference to FIG. 13, the following describes the flow for a case in which a printable standard sheet size 402 has been deleted by the administrator with reference to FIG. 14. First, the printer driver 303 determines whether or not a sheet size has been deleted through collective setting, similarly to the above-described case (step S1301). If the deletion has not been made through collective setting, the printer driver 303 determines whether or not the standard sheet deleted by the administrator had the largest standard size among printable standard sizes prior to the deletion (step S1302). If the deleted standard sheet had the largest standard size, the largest size of the user-defined sheet range 403 is changed in accordance with the next largest standard sheet size, that is to say, the largest standard size after the deletion (step S1304). Specifically, if the largest standard sheet size after the deletion is smaller than the largest size of the current user-defined sheet range 403, the largest size of the user-defined sheet range 403 is changed to the largest standard sheet size after the deletion. The size is changed individually for the width and the height. Therefore, if the largest size of printable user-defined sheets is already smaller than the largest standard sheet size after the deletion, nothing is performed. For example, in the present embodiment, if the checkbox for A3 included among the sheet sizes 402 is unchecked, the printer driver 303 changes the largest size of the user-defined sheet range 403 to the size of the next largest standard sheet, which is B4 having the largest size after the deletion. In step S1303, whether or not the deleted standard sheet size was the smallest printable standard size prior to the deletion is determined. If the deleted standard sheet size was the smallest printable standard size prior to the deletion, the printer driver changes the smallest size of the user-defined sheet range 403 in accordance with the next smallest standard sheet size, that is to say, the smallest size after the deletion (step S1305). Specifically, if the smallest standard sheet size after the deletion is larger than the smallest size of the current user-defined sheet range 403, the smallest size of the user-defined sheet range 403 is changed to the smallest standard sheet size after the deletion. The size is changed individually for the width and the height. Therefore, in this case also, if the smallest size of printable user-defined sheets is already larger than the smallest standard sheet size after the deletion, nothing is performed.

The above has described processing of the printer driver 303 for a case in which the sheet size setting screen 400 has been edited by the administrator with reference to FIGS. 13 and 14. When the OK button 105 is pressed, the printer driver 303 causes the processing of these figures to be reflected in the current setting values of the user-defined sheet range, together with the printable flags 602 in the printable sheet information list 600.

By implementing the present invention in the above-described manner, the administrator can configure setting so as to enable the user to select an optimal sheet size with respect to not only an existing model, but also a model to be sold in the future with unknown specifications. That is to say, with respect to an existing model, the administrator can collectively set printable standard sheet sizes and a user-defined sheet range as they are already known. On the other hand, with respect to a printer to be sold in the future with unknown specifications, the user is enabled to select an optimal sheet size through an easy operation. While there are conventional technologies to support a specific model through collective setting, implementation of the present invention enables more flexible and simpler system configuration.

<Processing for Changing Usable Standard Sheets Due to Change in User-Defined Sheet Range>

Figure 15:
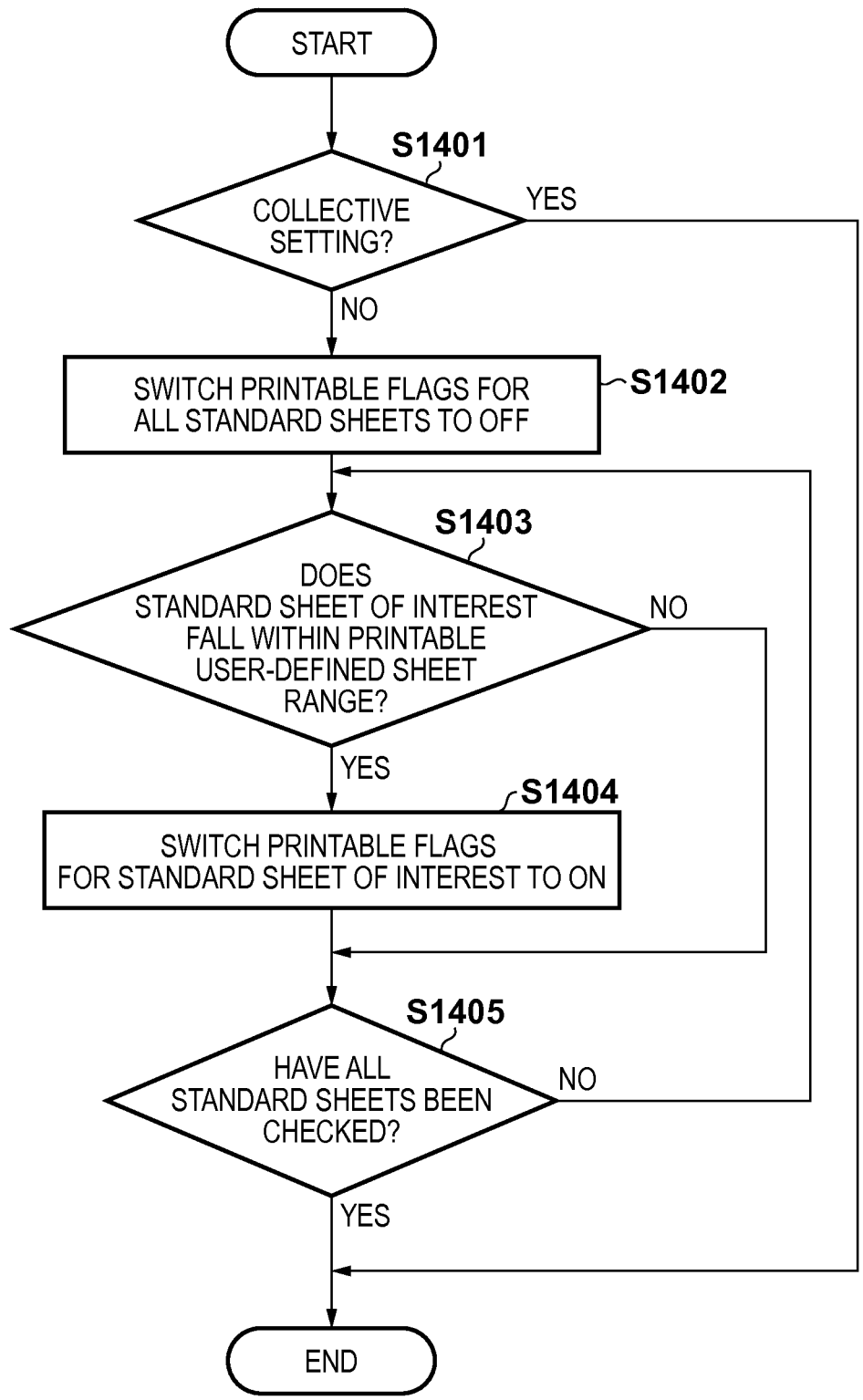
FIG. 15 is a flow diagram for a case in which a printable user-defined sheet range has been changed.

With reference to FIG. 15, the following describes the processing flow of the printer driver for a case in which the user-defined sheet range 403 on the sheet size setting screen 400 has been changed by the administrator. First, similarly to FIGS. 13 and 14, the printer driver 303 determines whether or not the user-defined sheet range 403 has been changed through collective setting (step S1401). If the change has been made through collective setting, nothing is performed. If the change has not been made through collective setting, the printer driver 303 proceeds to step S1402 and switches the printable flags 602 for all standard sheets to OFF. Then, the printer driver 303 determines whether or not standard sheets listed in advance fall within the printable user-defined sheet range 403 that has been set, on a sheet-by-sheet basis (step S1403). If a standard sheet of interest falls within the range, the printable flag 602 therefor is switched to ON (step S1404); if the standard sheet of interest does not fall within the range, the printable flag 602 therefor is not switched to ON. Finally, whether or not all standard sheets have been checked is determined, and if all standards sheets have not been checked yet, processing returns to step S1403, and processing is executed for the remaining standard sheets. In accordance with the change in the printable flags 602 in the processing of the flowchart of FIG. 15, the printer driver 303 also changes the checkboxes under the sheet sizes 402 on the sheet size setting screen 400. In this way, when the administrator inputs the printable user-defined sheet range 403, the printable sheet sizes 402 are automatically set, which is highly convenient.

Figure 16:
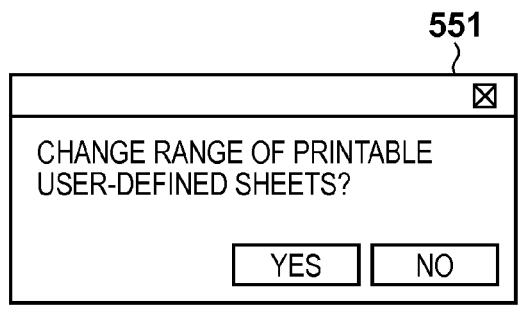
FIG. 16 shows a UI suggesting an automatic change in printable user-defined sheets.
Figure 17:
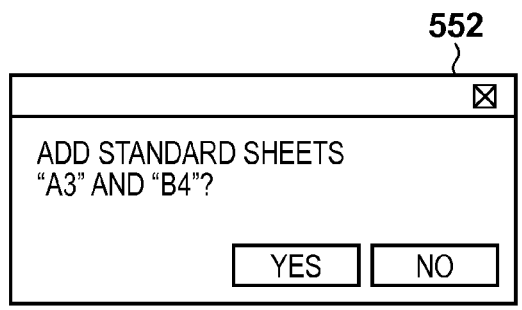
FIG. 17 shows a UI suggesting an automatic change in printable standard sheets.

The above has described the flows in which the printer driver 303 automatically changes the printable user-defined sheet range 403 with reference to FIGS. 13 and 14. At this time, a confirmation request dialog box 551 shown in FIG. 16 may be displayed to the administrator prior to execution of the processing of FIGS. 13 and 14. If "yes" indicating an approval is input through the dialog shown in FIG. 16, the processing of FIG. 13 or 14 is executed in accordance with addition or deletion of a standard size. Also, while the above has described the flow in which the printer driver 303 automatically changes the printable standard sheets 402 with reference to FIG. 15, a dialog box 552 shown in FIG. 17 may be displayed at this time. The printer driver 303 executes the above-described automatic change processing of FIG. 15 if "yes" indicating an approval is selected, and does not execute the automatic change processing if "no" is selected. These dialog boxes enable the administrator to inhibit the automatic processing of the printer driver 303 by selecting "no" if he/she does not want an automatic change.

As described above, according to the present embodiment, the printer driver can generate a list of standard sheets and user-defined sheets whose sizes fall within a user-defined sheet range, and provide the list to a user interface driver, the application, and the like. Also, in accordance with a change in the user-defined sheet range, standard sheets whose sizes fall within that range can be re-defined as printable standard sheets. Furthermore, in accordance with a change (addition or deletion) in usable standard sheets, the user-defined sheet range can be re-defined. Therefore, especially in a case where a general-purpose printer driver supporting a plurality of types of printers is used, user-defined sheets and sheets of standard sizes corresponding to settings of the user-defined sheet range are usable. Also, for example, user-defined sheets corresponding to settings of sheets of standard sizes can be displayed on a user interface as usable sheets, and a sheet to be used can be selected from among the displayed sheets.

While the present embodiment has described an example in which a list of standard sheets and user-defined sheets generated through the procedure shown in FIG. 12 is used for the document size as shown in FIGS. 8 and 11, it is also used for the output sheet size 102 shown in FIG. 4. It should be noted that, in the case of the output sheet size 102, an option "same as document size" is added to the list obtained through the procedure shown in FIG. 12.

Second Embodiment

In the first embodiment, a method is used in which the printable standard sheets 402 and the user-defined sheet range 403 on the sheet size setting screen 400 are reflected as-is in the document size 101 on the print setting screen 100 and printable sheet sizes provided to the application. The second embodiment pertains to a case in which the printer driver 303 is provided with a virtual sheet function.

With a virtual sheet function, a sheet size larger than the largest sheet size that is actually printable on the printer can be designated as a document sheet size from the application. In one specific example, the printer driver 303 provides the application and the OS with a list of printable sheet sizes including A3 size, even if the printer is actually capable of printing up to A4 size. When the application issues a print instruction for A3 size, a PDL of an output job is generated by reducing to A4 size, which is a sheet size printable in print processing of the printer driver 303. By thus providing the printer driver 303 with the virtual sheet function, the user can print a document that is not supposed to be printable in a smaller size. In the second embodiment also, it is assumed that the sheet size setting screen 400 is in the state shown in FIG. 5, the printable sheet information list 600 is in the state shown in FIG. 6, and the user-defined sheets in the list 700 shown in FIG. 7 have been registered with the OS.

Figure 18:
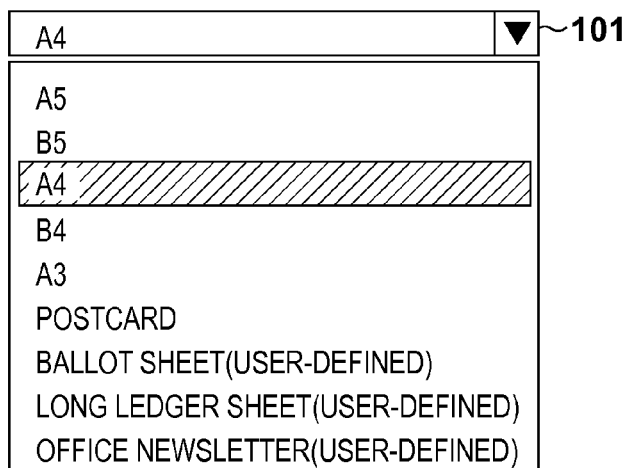
FIG. 18 shows options for the document size of the printer driver UI.

FIG. 18 shows options 803 for the document size 101 of the printer driver 303 in a case where the present invention is implemented with the presence of the virtual sheet function. Compared to the options 801 for the document size 101 according to the first embodiment, "B4", "A3", and "office newsletter" have been added. The same goes for a case in which a list of printable sheet sizes is provided to the OS and the application. As stated earlier, these sheet sizes represent virtual sheets; therefore, at the time of actual printing, the printer driver 303 generates a PDL of an output job by reducing to a printable sheet size. The printer driver 303 according to the present embodiment generates a PDL by reducing "B4" to "B5", "A3" to "A4", and "office newsletter" to "A4" which is a printable standard sheet closest thereto in size. In this way, the present invention is applicable also to a printer driver provided with virtual sheets.

Figure 19:
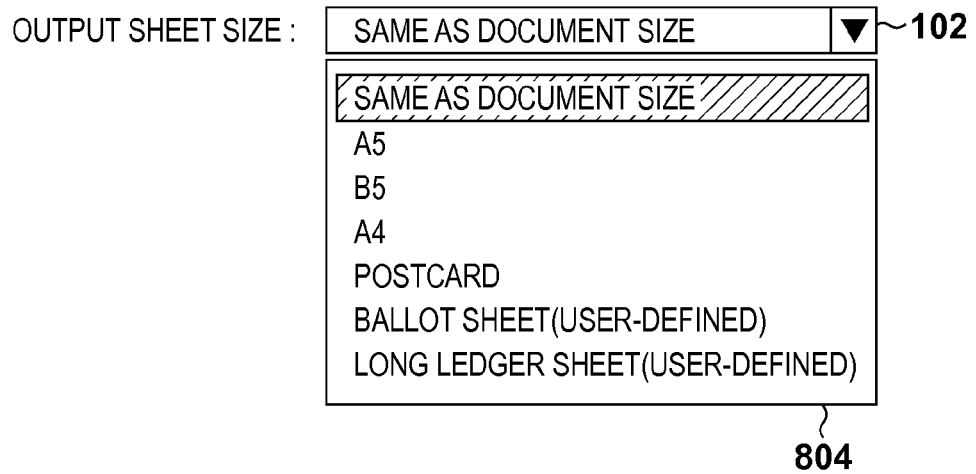
FIG. 19 shows options for an output sheet size of the printer driver UI.

As opposed to FIG. 18 showing the options 803 for the document size 101 on the print setting screen 100, FIG. 19 shows options 804 for the output sheet size 102 in the same state. In order to list the options for the output sheet size 102, the printer driver 303 provided with the virtual sheet function only lists the standard sheets 402 and user-defined sheets that fall within the user-defined sheet size range 403, which are designated on the sheet size setting screen 400. Regarding a document size, a document size exceeding usable sheet sizes can be selected as shown in FIG. 18; in this case, an output job is generated that has been reduced to the largest one of sheet sizes smaller than the document size among the usable sheet sizes. Alternatively, an output job may be generated that has been magnified or reduced to the smallest one of sheet sizes larger than the document size among the usable sheet sizes. One of magnification and reduction may be selected in advance; alternatively, comparing an absolute value of a difference between a magnification ratio and 100% with an absolute value of a difference between a reduction ratio and 100%, one of magnification and reduction that shows a smaller absolute value may be selected.

Figure 20:
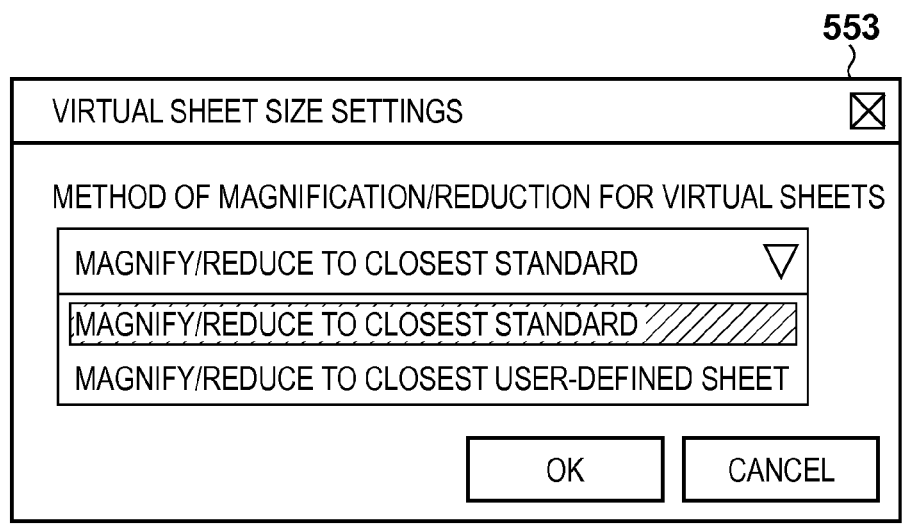
FIG. 20 shows a UI for setting a virtual sheet size.

While the earlier example has described reduction to the closest printable standard sheet when the application has designated a virtual user-defined sheet, reduction to the closest printable user-defined sheet is possible in practice. FIG. 20 shows a dialog 553 with which the printer driver 303 enables the user to change this setting. The printer driver 303 can decide on a post-reduction sheet size in accordance with the user setting configured on the dialog 553.

The above has described preferred examples of implementation of the present invention using two embodiments. By implementing the present invention in the above-described manner, the user can easily select only sheets that are printable on a printer while minimizing the trouble of the administrator, even with respect to a printer to be sold in the future with unknown specifications.

Other Embodiments

A further embodiment can be realized by using a sheet size setting screen 420 shown in FIG. 21 in place of the sheet size setting screen 400. Under the sheet sizes 402 on the sheet size setting screen 400, whether or not standard sheets are printable is only set on a sheet-by-sheet basis; in contrast, sheet sizes 422 on the sheet size setting screen 420 each have three types of states, that is to say, "available", "one side only", and "unavailable". In this way, control can be performed appropriately also for a sheet size that is unavailable in duplex printing but is available in one-side printing. Specifically, when the printer driver 303 generates options for the document sheet size 102 on the print setting screen 100 or provides a list of printable sheet sizes to the application, it lists only standard sheets for which "available" and "one side only" have been designated. It also prohibits duplex printing of standard sheets for which "one side only" has been designated. Furthermore, with respect to a printable user-defined sheet range 423, control for enabling only one-side printing is not performed, and duplex printing is always enabled. That is to say, with respect to usable sheet sizes, it is possible to set whether they are usable only in one-side printing or they are usable also in duplex printing. Other processing of the printer driver 303 is equivalent to the above-described processing, and therefore a description thereof is omitted here.

A yet further embodiment can be realized by using a sheet size setting screen 430 shown in FIG. 22. On this screen, compared to the above-described sheet size setting screen 420, the following ranges of printable user-defined sheets are separately designated: a simply printable range 433, and a duplex-printable range 434. In this case, "available" and "one side only" of printable standard sheets 432 are in coordination with the user-defined sheet range 433, whereas "available" of the printable standard sheets 432 is in coordination with the duplex-printable user-defined sheet range 434. That is to say, the procedures shown in FIGS. 12 to 15 are executed with respect to standard sheet sizes that are usable only in one-side printing, and with respect to a user-defined sheet range that is defined only for one-side printing. Also, the procedures shown in FIGS. 12 to 15 are executed with respect to standard sheet sizes that are usable without any side-related restriction, and with respect to a user-defined sheet range that is defined without any side-related restriction. In this way, the application, the user interface driver, or the like can be provided with not only a list of sheets that are usable in one-side printing, but also a list of sheets that are usable without any side-related restriction. Also, user-defined sheets compliant with a change in standard sheet sizes can be identified, and conversely, standard sheet sizes compliant with a change in a user-defined range can be identified, not only for sheets that are usable in one-side printing, but also for sheets that are usable without any side-related restriction.

With the printer driver 303 implementing other embodiments described above, conformity with a printer with unknown specifications can be achieved in a more detailed manner without the user re-installing the printer driver.

The first and second embodiments have described a case in which standard sheets are changed manually via a user interface. However, a range of user-defined sheet sizes can be decided on by the printer driver obtaining the sizes of sheets set in sheet cassettes from a printer, and executing the processing of FIGS. 13 and 14 using the obtained sheet sizes as usable standard sheets.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261841, filed Dec. 18, 2013 which is hereby incorporated by reference herein in its entirety.

What is claimed is:

1. An information processing apparatus connectable to an image forming apparatus, the information processing apparatus comprising:
    a processor;
    a holding unit that holds information regarding a plurality of user-defined sheets, the information regarding a plurality of user-defined sheets including information indicating a sheet size;
    a user interface unit that displays a sheet size setting screen for setting a range of a size of a user-defined sheet printable on the image forming apparatus;
    a setting unit that sets the range of the size of the user-defined sheet using the sheet size setting screen;
    a specification unit that specifies a user-defined sheet which falls within the range of the size set by the setting unit out of the plurality of user-defined sheets, using the information regarding the plurality of user-defined sheets held by the holding unit and the range of the size of the user-defined sheet;
    a display unit that displays the specified user-defined sheet as an option for a sheet size of print setting information; and
    a memory including instructions that, when executed by the processor, cause the processor to function as one or more of the holding unit, the user interface unit, the setting unit, and the specification unit.

2. The information processing apparatus according to claim 1, further comprising:
    a change unit that, when a standard sheet is set on the sheet size setting screen, changes the range of the size of the user-defined sheet in accordance with the set standard sheet; and
    a unit that, in response to a request for a printable sheet list, returns a list of the printable standard sheet and a user-defined sheet that falls within the range of the size of the printable user-defined sheet to a source of the request,
    wherein the memory includes further instructions that, when executed by the processor, cause the processor to function as one or more of the change unit and the unit.

3. The information processing apparatus according to claim 2, wherein
    the change unit displays a request for confirmation of a change before changing a range of a width and a height of the printable user-defined sheet.

4. The information processing apparatus according to claim 2, wherein
    when the printable standard sheet is set by the user interface unit, the change unit changes a range of a width and a height of the printable user-defined sheet to a range within which the set printable standard sheet falls.

5. The information processing apparatus according to claim 2, wherein
    when a range of a width and a height of the printable user-defined sheet is set by the user interface unit, the change unit further changes the printable standard sheet in accordance with the set range of the width and the height of the printable user-defined sheet.

6. The information processing apparatus according to claim 2, wherein
    the user interface unit is capable of setting the printable standard sheet and a range of a width and a height of the printable user-defined sheet, separately for a standard sheet and a range of a width and a height of a user-defined sheet that are printable in one-side printing, and for a standard sheet and a range of a width and a height of a user-defined sheet with no side-related restriction, and
    when the printable standard sheet is set by the user interface unit, the change unit changes the range of the width and the height of the printable user-defined sheet in accordance with the set printable standard sheet, separately for the standard sheet and the range of the width and the height of the user-defined sheet that are printable in one-side printing, and for the standard sheet and the range of the width and the height of the user-defined sheet with no side-related restriction.

7. The information processing apparatus according to claim 2, wherein
    the user interface unit is further capable of collectively setting the printable standard sheet and a range of a width and a height of the size of the printable user-defined sheet, and
    the change unit does not change the standard sheet or a width and a height of the user-defined sheet when the collective setting has been performed.

8. The information processing apparatus according to claim 2, wherein, in response to a print request for a sheet size larger than a range of a width and a height of the size of the printable user-defined sheet, print processing is executed by reducing to a size of one of the printable standard sheets.

9. The information processing apparatus according to claim 2, wherein, in response to a print request for a sheet size larger than a range of a width and a height of the size of the printable user-defined sheet, print processing is executed by reducing to a size of one of the user-defined sheets that fall within the range of the width and the height of the size of the printable user-defined sheet.

10. The information processing apparatus according to claim 1, being connectable to the image forming apparatus included among a plurality of types of image forming apparatuses.

11. A sheet size setting method performed by an information processing apparatus connectable to an image forming apparatus, the information processing apparatus having a holding unit that holds information regarding a plurality of user-defined sheets, the information regarding a plurality of user-defined sheets including information indicating a sheet size, the sheet size setting method comprising:
- displaying a sheet size setting screen for setting a range of a size of a user-defined sheet printable on the image forming apparatus;
- setting the range of the size of the user-defined sheet using the sheet size setting screen;
- specifying a user-defined sheet which falls within the range of the size set in the setting out of the plurality of user-defined sheets, using the information regarding the plurality of user-defined sheets held by the holding unit and the range of the size of the user-defined sheet; and
- displaying the specified user-defined sheet as an option for a sheet size of print setting information.

12. A non-transitory computer-readable medium having recorded therein a program for causing a sheet size determination method to be executed using a computer, the computer having a holding unit that holds information regarding a plurality of user-defined sheets, the information regarding a plurality of user-defined sheets including information indicating a sheet size, the sheet size determination method comprising:
- displaying a sheet size setting screen for setting a range of a size of a user-defined sheet printable on an image forming apparatus;
- setting the range of the size of the user-defined sheet using the sheet size setting screen;
- specifying a user-defined sheet which falls within the range of the size set in the setting out of the plurality of user-defined sheets, using the information regarding the plurality of user-defined sheets held by the holding unit and the range of the size of the user-defined sheet; and
- displaying the specified user-defined sheet as an option for a sheet size of print setting information.

* * * * *